US012664823B2

(12) United States Patent  
Liu et al.

(10) Patent No.: US 12,664,823 B2  
(45) Date of Patent: Jun. 23, 2026

(54) LIVENESS DETECTION APPARATUS AND METHOD

(71) Applicants: HON HAI PRECISION INDUSTRY CO., LTD., New Taipei City (TW); Foxconn Technology Group Co., Ltd., Guangdong Province (CN)

(72) Inventors: Yen-Chun Liu, New Taipei City (TW); Hao Syuan Chang, New Taipei City (TW)

(73) Assignees: HON HAI PRECISION INDUSTRY CO., LTD., New Taipei City (TW); Foxconn Technology Group Co., Ltd., Guangdong Province (CN)

( * ) Notice: Subject to any disclaimer, the term of this patent is extended or adjusted under 35 U.S.C. 154(b) by 1 day.

(21) Appl. No.: 19/052,315

(22) Filed: Feb. 13, 2025

(65) Prior Publication Data

US 2026/0120514 A1 Apr. 30, 2026

(30) Foreign Application Priority Data

Oct. 25, 2024 (TW) ................................. 113140912

(51) Int. Cl.
| | |
|---|---|
| *G06V 40/40* | (2022.01) |
| *G06V 20/59* | (2022.01) |
| *G06V 40/18* | (2022.01) |

(52) U.S. Cl.
CPC ............ *G06V 40/40* (2022.01); *G06V 20/597* (2022.01); *G06V 40/18* (2022.01)

(58) Field of Classification Search
CPC ...... G06V 20/597; G06V 20/59; G06V 40/18; G06V 40/40

USPC ........ 348/78; 340/575, 540, 573.1; 382/118, 382/115, 117

See application file for complete search history.

(56) References Cited

U.S. PATENT DOCUMENTS

| | | | |
|---|---|---|---|
| 2013/0016882 A1* | 1/2013 | Cavallini | ............ G06V 40/172 382/117 |
| 2024/0020992 A1 | 1/2024 | Barth et al. | |

FOREIGN PATENT DOCUMENTS

| | | |
|---|---|---|
| CN | 105139584 A | 12/2015 |
| CN | 109377679 A | 2/2019 |
| CN | 112183449 A | 1/2021 |
| CN | 117392644 A | 1/2024 |
| CN | 117877202 A | 4/2024 |
| TW | 202011260 A | 3/2020 |
| TW | 202026948 A | 7/2020 |
| TW | 202036462 A | 10/2020 |
| TW | 202038191 A | 10/2020 |

(Continued)

*Primary Examiner* — Sherrie Hsia

(74) *Attorney, Agent, or Firm* — CKC & Partners Co., LLC

(57) ABSTRACT

A liveness detection apparatus and method are provided. The apparatus captures a live image of a driver. The apparatus calculates an eye open duration of the driver based on the live image within a first time interval. In response to the eye open duration exceeding a first duration threshold, the apparatus executes a first confirmation operation to notify the driver to complete a liveness detection operation. In response to the first confirmation operation has been executed, the apparatus continues to calculate the eye open duration based on the live image within a second time interval. In response to the eye open duration exceeding a second duration threshold, the apparatus executes a second confirmation operation to notify the driver to complete the liveness detection operation.

20 Claims, 5 Drawing Sheets

200

(56) References Cited

FOREIGN PATENT DOCUMENTS

| TW | 202121251 A | 6/2021 |
| TW | 202146265 A | 12/2021 |

* cited by examiner

LIVENESS DETECTION APPARATUS AND METHOD

CROSS-REFERENCE TO RELATED APPLICATION

This application claims priority to Taiwan Application Serial Number 113140912, filed Oct. 25, 2024, which is herein incorporated by reference in its entirety.

BACKGROUND

Field of Invention

The present disclosure relates to a liveness detection apparatus and method. More particularly, the present disclosure relates to a liveness detection apparatus and method for vehicles.

Description of Related Art

With the development of driving assistance technology, liveness detection technology can be used to confirm whether the driver is focused on the driving environment and has the ability to control a vehicle. Specifically, a driver monitoring system can be installed on the vehicle to confirm whether the driver is tired or inattentive through apparatuses such as cameras and sensors.

However, drivers may avoid the monitoring by pasting photos in front of the camera.

In view of this, how to avoid being evaded and prompt the driver to complete the liveness detection is the goal that the industry strives to work on.

SUMMARY

The disclosure provides a liveness detection apparatus comprising a camera and a processor. The camera is configured to capture a live image of a driver. The processor is coupled to the camera and configured to execute the following operations: calculating an eye open duration of the driver based on the live image within a first time interval; in response to the eye open duration exceeding a first duration threshold, executing a first confirmation operation to notify the driver to complete a liveness detection operation; in response to the first confirmation operation has been executed, continuing to calculate the eye open duration based on the live image within a second time interval, wherein the second time interval is later than the first time interval; and in response to the eye open duration exceeding a second duration threshold, executing a second confirmation operation to notify the driver to complete the liveness detection operation, wherein the second duration threshold is greater than the first duration threshold.

The disclosure further provides a liveness detection method, being adapted for use in an electronic apparatus, wherein the liveness detection method comprises the following steps: capturing a live image of a driver; calculating an eye open duration of the driver based on the live image within a first time interval; in response to the eye open duration exceeding a first duration threshold, executing a first confirmation operation to notify the driver to complete a liveness detection operation; in response to the first confirmation operation has been executed, continuing to calculate the eye open duration based on the live image within a second time interval, wherein the second time interval is later than the first time interval; and in response to the eye open duration exceeding a second duration threshold, executing a second confirmation operation to notify the driver to complete the liveness detection operation, wherein the second duration threshold is greater than the first duration threshold.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
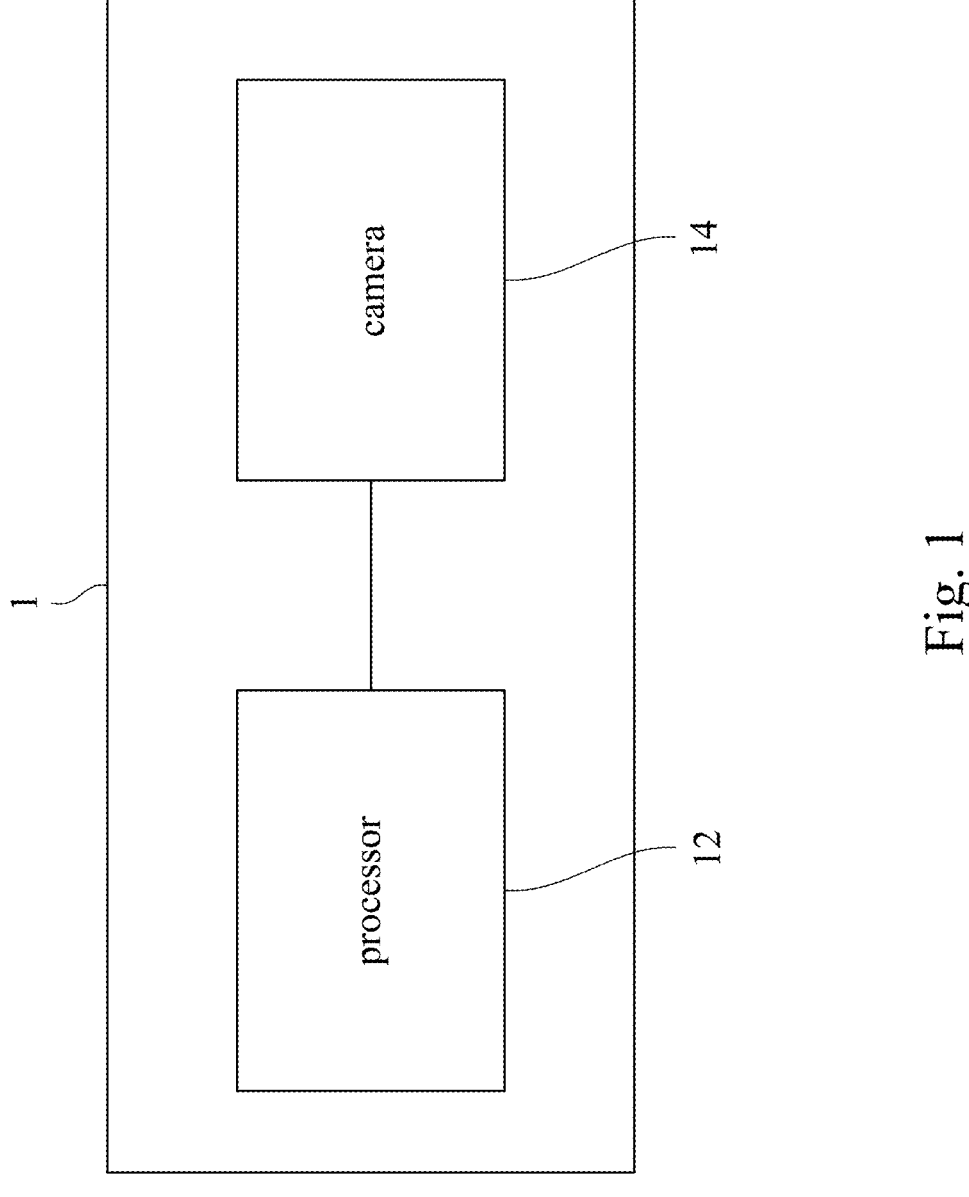
FIG. 1 is a schematic diagram illustrating a liveness detection apparatus according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1, which is a schematic diagram illustrating a liveness detection apparatus 1 according to a first embodiment of the present disclosure. The liveness detection apparatus 1 comprises a processor 12 and a camera 14, wherein the processor 12 is electrically connected to the camera 14. The liveness detection apparatus 1 is configured to perform liveness detection on a driver.

In some embodiments, the processor 12 comprises a central processing unit (CPU), a graphics processing unit (GPU), a multi-processor, a distributed processing system, an application specific integrated circuit (ASIC), and/or a suitable processing unit.

The camera 14 comprises one or more image capture unit configured to capture driver images. The camera 14 is configured to capture a live image of a driver. In some embodiments, the camera 14 comprises a lens configured in a vehicle and facing toward the driver's seat. Accordingly, the liveness detection apparatus 1 is able to confirm the driver's state based on the live image.

Furthermore, in order to complete the liveness detection operation, the liveness detection apparatus 1 calculates the eye open duration of the driver based on the image and determines whether the driver avoids the detection. Due to the human's physiological mechanism, human eyes blink from time to time and will not keep them open for a long time. Therefore, when determining that the driver maintains opened-eyes for too long, the liveness detection apparatus 1 notifies the driver to complete the liveness detection operation. Accordingly, compared to raising hand, talking, or other action, the driver may complete the liveness detection operation through blinking, which is simple action that do not interfere with driving safety. Additionally, the liveness detection apparatus 1 can also prevent the driver from avoiding the detection by blocking the camera with photo. Therefore, the liveness detection apparatus 1 is not only able to complete the liveness detection operation but also prevent the driver from cheating to make sure other systems can operate properly (e.g., other driving assistance systems also using the images captured by the camera 14).

Specifically, the processor 12 is configured to execute the following operations: calculating an eye open duration of the driver based on the live image within a first time interval; in response to the eye open duration exceeding a first duration threshold, executing a first confirmation operation to notify the driver to complete a liveness detection operation; in response to the first confirmation operation has been executed, continuing to calculate the eye open duration based on the live image within a second time interval, wherein the second time interval is later than the first time interval; and in response to the eye open duration exceeding a second duration threshold, executing a second confirmation operation to notify the driver to complete the liveness detection operation, wherein the second duration threshold exceeds the first duration threshold.

Figure 2:
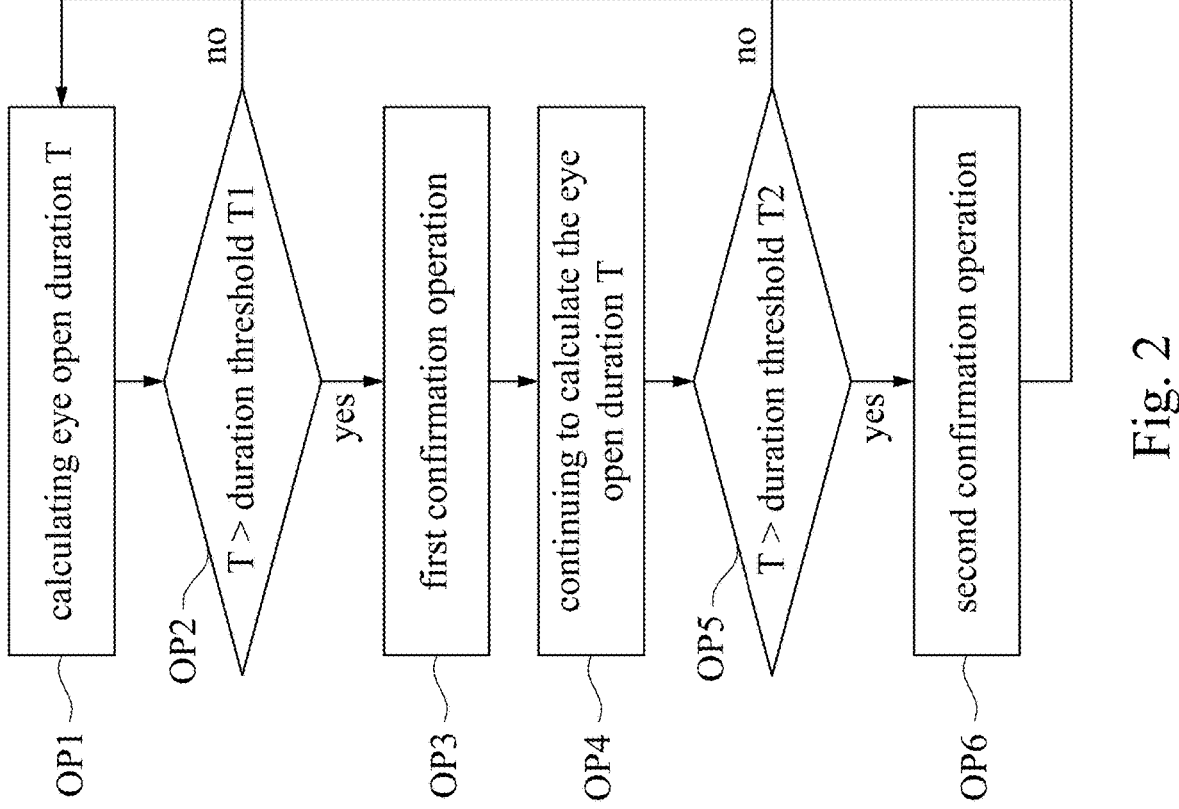
FIG. 2 is a schematic diagram illustrating the liveness detection apparatus executing liveness detection according to some embodiments of the present disclosure.

About the detail operation of the liveness detection apparatus 1 performing the liveness detection operation on the driver, please refer to FIG. 2. The liveness detection apparatus 1 performs the liveness detection operation on the driver by executing operations OP1~OP6.

First, in the operation OP1, the liveness detection apparatus 1 calculates an eye open duration T of a driver based on a live image.

Next, in the operation OP2, the liveness detection apparatus 1 determines whether the eye open duration T exceeds a duration threshold T1 (e.g., 10 seconds). Correspondingly, when the eye open duration T exceeds the duration threshold T1, the liveness detection apparatus 1 further executes the operation OP3; relatively, when the eye open duration T does not exceed the duration threshold T1, the liveness detection apparatus 1 returns to the operation OP1, continuing to calculate the eye open duration T.

After determining that the eye open duration T exceeds the duration threshold T1, in the operation OP3, the liveness detection apparatus 1 executes a first confirmation operation to notify the driver to complete the liveness detection operation.

In some embodiments, the first confirmation operation comprises the liveness detection apparatus 1 controlling an output apparatus on the vehicle (e.g., a speaker, a display screen, or a light) to send reminder (e.g., making sound, displaying notice, emitting or flashing the light) to notify the driver. Specifically, the first confirmation operation comprises the processor 12 of the liveness detection apparatus 1 executing the following operation: generating a notify signal to control an output apparatus to send a reminder.

Next, in the operation OP4, the liveness detection apparatus 1 continues to calculate the eye open duration T based on the live image.

Next, in the operation OP5, the liveness detection apparatus 1 determines whether the eye open duration T exceeds the duration threshold T2 (e.g., 15 seconds). Correspondingly, when the eye open duration T exceeds the duration threshold T2, the liveness detection apparatus 1 further executes the operation OP6; relatively, when the eye open duration T does not exceed the duration threshold T2, the liveness detection apparatus 1 returns to the operation OP1, continuing to calculate the eye open duration T.

After determining that the eye open duration T exceeds the duration threshold T2, in the operation OP6, the liveness detection apparatus 1 executes the second confirmation operation to notify the driver to complete the liveness detection operation again.

In some embodiments, the second confirmation operation comprises more aggressive notify operation relative to the first confirmation operation. For example, the first confirmation operation notifies by the light, and the second confirmation operation notifies by the light and also the speaker making sound. Specifically, the second confirmation operation comprises the processor 12 of the liveness detection apparatus 1 executing the following operation: generating a notify signal to control an output apparatus to send a reminder.

In some embodiments, when determining that the eye open duration T exceeds the duration threshold T2, the liveness detection apparatus 1 may also adjust the involvement level of the driving assistance functions (e.g., Autonomous Emergency Braking (AEB), Adaptive Cruise Control (ACC), Lane Centering Control (LCC)) to reduce the driving risk of the vehicle.

Specifically, the second confirmation operation comprises the processor 12 of the liveness detection apparatus 1 executing the following operations: increasing a triggered count; and in response to the triggered count exceeding a count threshold, adjusting a driving assistance parameter, wherein the driving assistance parameter is configured to determine a level of driving assistance involvement for a vehicle drove by the driver.

For example, when the eye open duration T exceeds the duration threshold T2, the liveness detection apparatus 1 will record the number of the abnormal occurrences, i.e., increasing the triggered count by 1. When the triggered count exceeds 2 times, in order to avoid the driver from distraction and further causing accident, the liveness detection apparatus 1 adjusts a driving assistance parameter to increase a level of driving assistance involvement, e.g., increasing distance from the vehicle in front, reducing driving speed, increasing the decision-making time of the automatic braking system to intervene in braking earlier.

After executing the operation OP6, the liveness detection apparatus 1 returns to the operation OP1 to continue to monitoring the driver.

Accordingly, when detecting that there is an abnormal eye-opened situation of the driver, the liveness detection apparatus 1 is able to notify the driver through different ways. Additionally, when the driver still does not complete the liveness detection operation after being notified, the liveness detection apparatus 1 may further take more proactive notify measures or reduce the driving risk in other way.

In some embodiments, while calculating the eye open duration T, the liveness detection apparatus 1 calculates an eye-opening ratio of the driver to determine whether the driver is opening or closing their eyes.

Specifically, the operation of calculating the eye open duration further comprises: calculating a first eye-opening ratio of the driver in the live image within the first time interval; and determining whether the driver opens their eyes based on the first eye-opening ratio.

Correspondingly, when the driver closes their eyes, the liveness detection apparatus 1 re-timing the eye open duration T.

Specifically, wherein the processor 12 is further configured to execute the following operation: in response to determining the driver closing their eyes, recalculating the eye open duration of the driver in the live image.

Furthermore, in some embodiments, while calculating eye-opening ratio, the liveness detection apparatus 1 searches the live image for eye feature points of the driver and further calculates the eye-opening ratio of the driver based on the eye feature points.

Specifically, the operation of the processor 12 calculating the first eye-opening ratio of the driver in the live image further comprises: searching for a plurality of eye feature points of the driver in the live image; and calculating the first eye-opening ratio of the driver in the live image based on the eye feature points.

Additionally, in some embodiments, while calculating the eye-opening ratio, the liveness detection apparatus 1 calculates an eyelid distance between upper and lower eyelids and an eye corner distance between left and right eye corners and takes the ratio of the eyelid distance to the eye corner distance as the eye-opening ratio of the driver.

Specifically, the operation of the processor 12 calculating the first eye-opening ratio of the driver in the live image further comprises: calculating a first distance between an upper eyelid and a lower eyelid; calculating a second distance between a left eye corner and a right eye corner; and calculating a ratio of the first distance and the second distance as the first eye-opening ratio.

Figure 3:
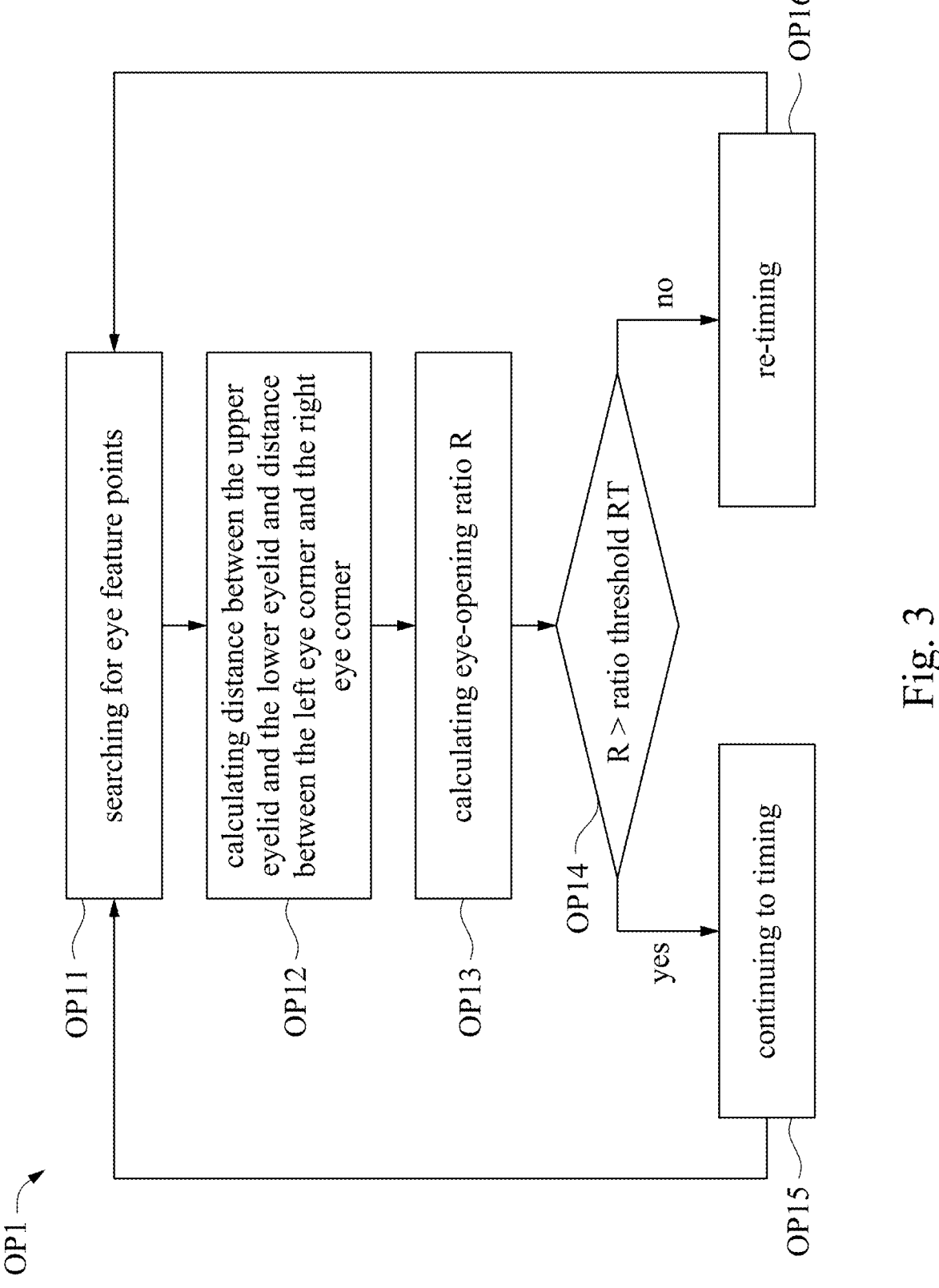
FIG. 3 is a schematic diagram illustrating the liveness detection apparatus calculating the eye open duration according to some embodiments of the present disclosure.

About the details of the liveness detection apparatus 1 calculating the eye open duration T, please refer to FIG. 3. As shown in the figure, in some embodiments, the operation OP1 for calculating the eye open duration T further comprises operations OP11~OP16.

First, in the operation OP11, the liveness detection apparatus 1 searches for eye feature points. For example, the processor 12 searches the eye feature points in the live image by using an image recognition model, wherein the feature points correspond to one or more positions of the eyes of the driver, e.g., eye corners, eyelid margins, pupils, etc.

Figure 4:
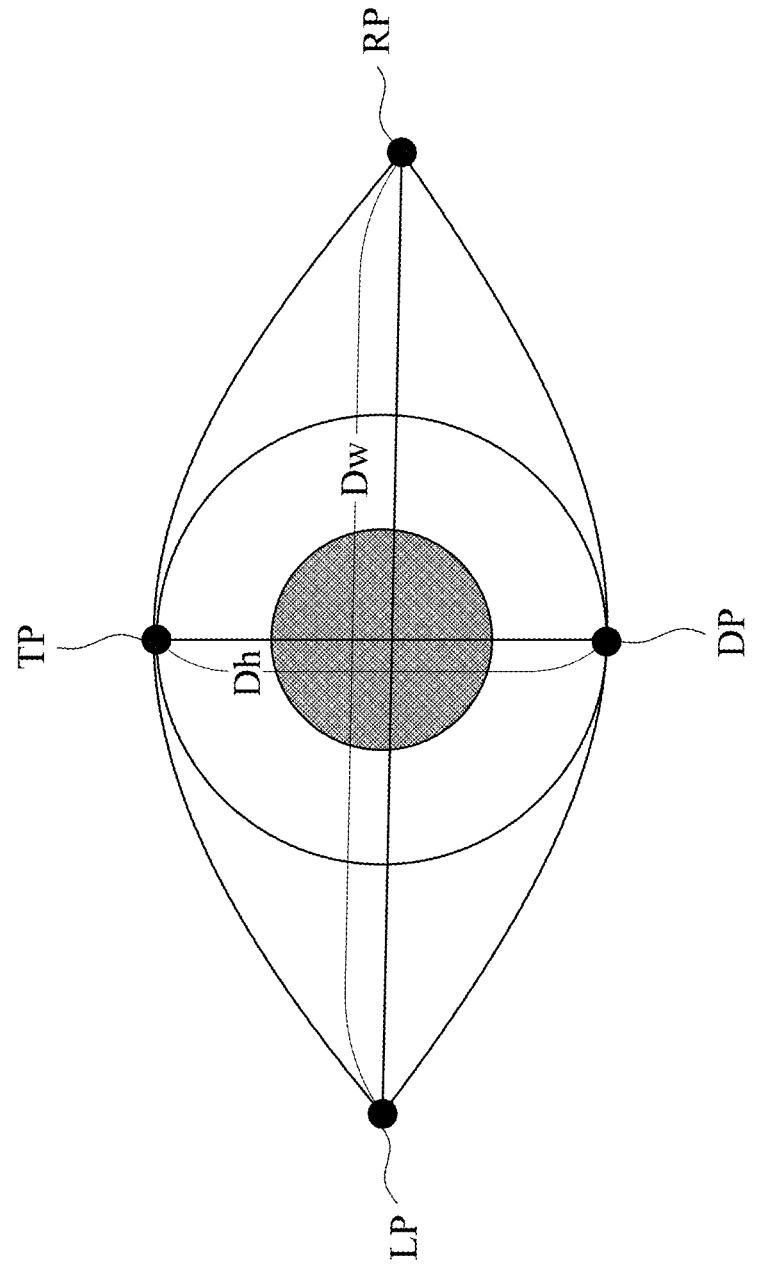
FIG. 4 is a schematic diagram illustrating the distance between upper and lower eyelids and the distance between left and right eye corners according to some embodiments of the present disclosure.

About the eye feature points, please refer to FIG. 4. As shown in the figure, the processor 12 searches an upper eyelid middle feature point TP, an lower eyelid middle feature point DP, a left eye corner feature point LP, and a right eye corner feature point RP.

Next, in the operation OP12, the liveness detection apparatus 1 calculates the distance between the upper eyelid and the lower eyelid and the distance between the left eye corner and the right eye corner. As shown in FIG. 4, the processor 12 calculates the distance between the eyelids Dh based on the feature points TP and DP and the distance between the eye corners Dw based on the feature points LP and RP.

Next, in the operation OP13, the liveness detection apparatus 1 calculates an eye-opening ratio R. As shown if FIG. 4, the processor 12 may may calculate the eye-opening ratio R based on the distance between the eyelids Dh and the distance between the eye corners Dw by using the following formula 1.

$$R = \frac{Dh}{Dw},$$ (formula 1).

As shown in the formula 1 above, when the driver closes their eyes, since the eyelids are closed, the eye-opening ratio R will approach 0. Relatively, when the driver opens their eyes, the eye-opening ratio R will remain at a certain positive value.

Accordingly, in the operation OP14, the liveness detection apparatus 1 is able to determine whether the driver opens their eyes by confirming whether the eye-opening ratio R is greater than a ratio threshold RT.

If the eye-opening ratio R is greater than a ratio threshold RT, the liveness detection apparatus 1 determines that the driver keeps their eyes open and executes the operation OP15 to continue to calculate the eye open duration T.

Relatively, if the eye-opening ratio R is not greater than the ratio threshold RT, the liveness detection apparatus 1 determines that the driver closes their eyes and executes the operation OP16 to re-timing the eye open duration T.

Furthermore, after the operations OP15 and OP16, the liveness detection apparatus 1 returns to the operation OP11 to keep calculating the eye open duration T.

Therefore, the liveness detection apparatus 1 is able to determine whether the driver closes their eyes based on the live image to calculate the eye open duration T.

It is noted that, the liveness detection apparatus 1 may select one of the eyes or both eyes of the driver to execute the operations above, and the present disclosure is not limited thereto.

In some embodiments, due to individual differences in the size of each person's eyes, the liveness detection apparatus 1 may also dynamically adjust the ratio threshold RT based on images of the driver.

Specifically, the operation of the processor 12 calculating the eye open duration further comprises: calculating a plurality of second eye-opening ratios of the driver in the live image within a third time interval; calculating a ratio threshold based on the second eye-opening ratios; and calculating the eye open duration within the first time interval and the second time interval based on the ratio threshold.

For example, after the vehicle starts, the liveness detection apparatus 1 captures a live image for 30 seconds and searches for eye feature points of the driver in the live image. Furthermore, the liveness detection apparatus 1 sorts eye-opening ratios R calculated based on the eye feature points by values. Next, the liveness detection apparatus 1 removes 50% eye-opening ratios R with lower values to filter out the eye-closed values. Also, the liveness detection apparatus 1 removes 5% eye-opening ratios R with higher values to filter out the outlier values. Finally, the liveness detection apparatus 1 calculates the average value of the 45% remaining eye-opening ratios R and takes half the average value (or lower) as the ratio threshold RT used for the trip to avoid to misjudge the driver closing their eyes.

In some embodiments, corresponding to different driving scenarios, the liveness detection apparatus 1 may dynamically adjust the duration thresholds T1 and T2.

In one of the embodiments, the liveness detection apparatus 1 obtains vehicle speed, tire pressure, outside rain, visibility, transmission/throttle/braking system data, system alarm, and/or other vehicle data and evaluates whether the driver and the vehicle are in a high-risk driving state. If so, the liveness detection apparatus 1 reduce the duration thresholds T1 and T2 to execute more aggressive liveness detection operation.

Specifically, the processor 12 is further configured to execute the following operations: determining whether the driver is in a high-risk driving state based on one or more vehicle parameter; and in response to the driver being in the high-risk driving state, reducing the first duration threshold and the second duration threshold.

For example, when the vehicle speed exceeds 100 kilometers per hour, the liveness detection apparatus 1 reduces the duration threshold T1 from 10 seconds to 9 seconds and reduces the duration threshold T2 from 15 seconds to 13 seconds to reduce the reaction time for the liveness detection operation.

In another embodiment, the liveness detection apparatus 1 may also calculate a weight based on the aforementioned data and adjust the duration thresholds T1 and T2 correspondingly.

Specifically, the processor 12 is further configured to execute the following operations: calculating a weight based on one or more vehicle parameter; and calculating the first duration threshold and the second duration threshold based on the weight.

For example, the faster the vehicle speed, the heavier the outside rain, and/or the lower the visibility, then the lower the weight calculated by the liveness detection apparatus 1. Correspondingly, the liveness detection apparatus 1 may calculate the lower the duration thresholds T1 and T2 to reduce the reaction time for the liveness detection operation.

In summary, the liveness detection apparatus 1 provided by the present disclosure performs liveness detection operation on the driver by monitoring eye movements of the driver. In the meantime, the liveness detection apparatus 1 prevent the driver from avoiding the detection to make sure other systems can operate properly. When detecting abnormal occurrences, the liveness detection apparatus 1 notifies the driver to complete the liveness detection operation. If the liveness detection operation is not completed after the notification, the liveness detection apparatus 1 further notifies the driver more aggressively and/or intervenes the control system of the vehicle to reduce the driving risk. Additionally, the liveness detection apparatus 1 may also dynamically adjust the eye parameter of the driver for different eye features of different drivers and adjust the reaction time for notifying the driver for different driving scenarios to apply to more driving scenarios.

Figure 5:
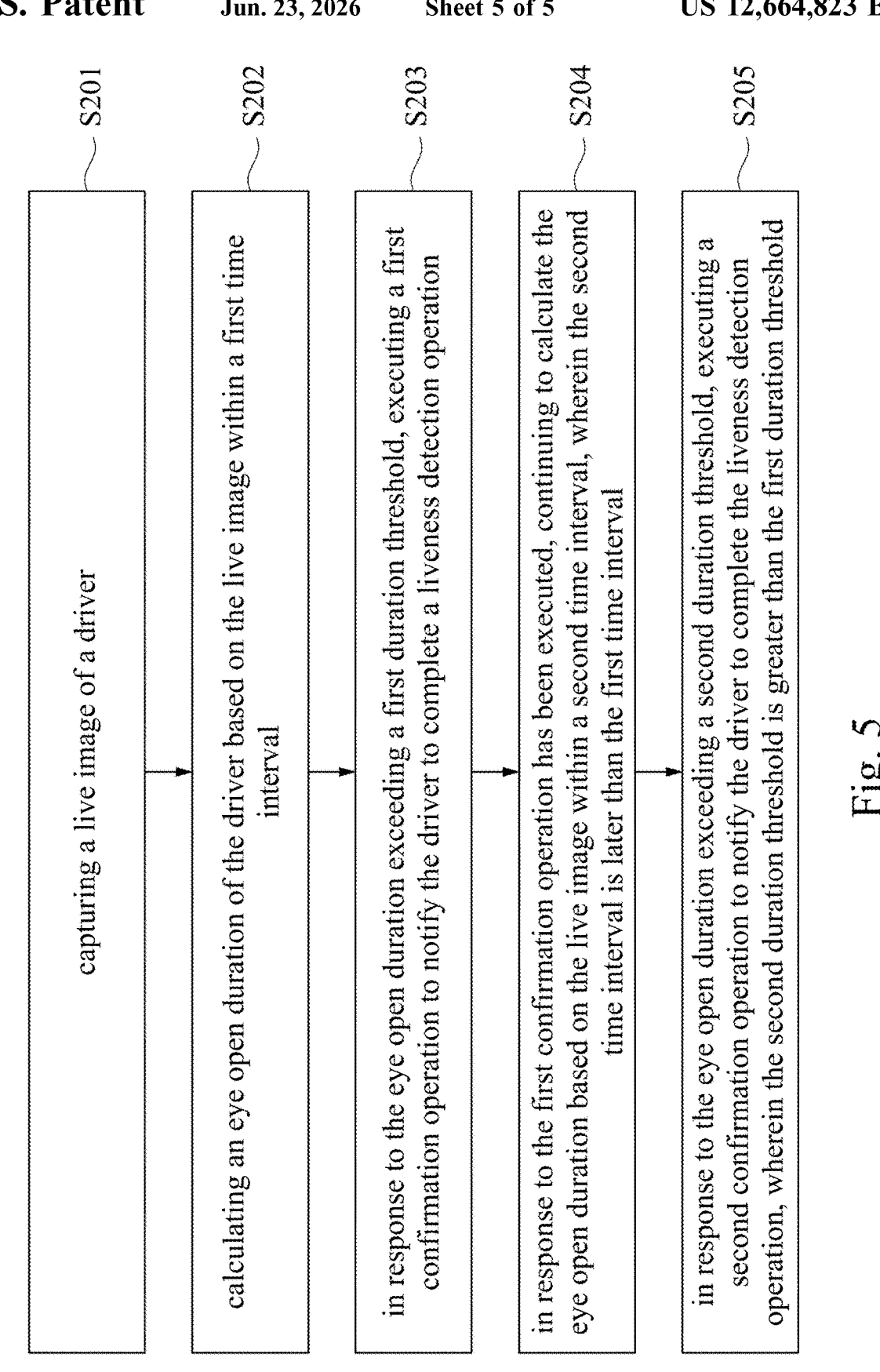
FIG. 5 is a flow diagram illustrating a liveness detection method according to a second embodiment of the present disclosure.

Please refer to FIG. 5, which is a flow diagram illustrating a liveness detection method 200 according to a second embodiment of the present disclosure. The liveness detection method 200 comprises steps S201-S205. The liveness detection method 200 is configured to perform liveness detection on a driver. The liveness detection method 200 can be executed by an electronic apparatus (e.g., the liveness detection apparatus 1 in the first embodiment).

First, in the step S201, the electronic apparatus captures a live image of a driver.

Next, in the step S202, the electronic apparatus calculates an eye open duration of the driver based on the live image within a first time interval.

Next, in the step S203, in response to the eye open duration exceeding a first duration threshold, the electronic apparatus executes a first confirmation operation to notify the driver to complete a liveness detection operation.

Next, in the step S204, in response to the first confirmation operation has been executed, the electronic apparatus continues to calculate the eye open duration based on the live image within a second time interval, wherein the second time interval is later than the first time interval.

Finally, in the step S205, in response to the eye open duration exceeding a second duration threshold, executes a second confirmation operation to notify the driver to complete the liveness detection operation, wherein the second duration threshold is greater than the first duration threshold.

In some embodiments, the step S202 further comprises the electronic apparatus calculating a first eye-opening ratio of the driver in the live image within the first time interval; and the electronic apparatus determining whether the driver opens their eyes based on the first eye-opening ratio.

In some embodiments, the step of calculating the first eye-opening ratio of the driver in the live image further comprises: the electronic apparatus searching for a plurality of eye feature points of the driver in the live image; and the electronic apparatus calculating the first eye-opening ratio of the driver in the live image based on the eye feature points.

In some embodiments, the step of calculating the first eye-opening ratio of the driver in the live image further comprises: the electronic apparatus calculating a first distance between an upper eyelid and a lower eyelid; the electronic apparatus calculating a second distance between a left eye corner and a right eye corner; and the electronic apparatus calculating a ratio of the first distance and the second distance as the first eye-opening ratio.

In some embodiments, the step S202 further comprises the electronic apparatus calculating a plurality of second eye-opening ratios of the driver in the live image within a third time interval; the electronic apparatus calculating a ratio threshold based on the second eye-opening ratios; and the electronic apparatus calculating the eye open duration within the first time interval and the second time interval based on the ratio threshold.

In some embodiments, the first confirmation operation comprises the following step: the electronic apparatus generating a notify signal to control an output apparatus to send a reminder.

In some embodiments, the second confirmation operation comprises the following steps: the electronic apparatus increasing a triggered count; and in response to the triggered count exceeding a count threshold, the electronic apparatus adjusting a driving assistance parameter, wherein the driving assistance parameter is configured to determine a level of driving assistance involvement for a vehicle drove by the driver.

In some embodiments, the liveness detection method 200 further comprises in response to determining the driver closing their eyes, the electronic apparatus recalculating the eye open duration of the driver in the live image.

In some embodiments, the liveness detection method 200 further comprises the electronic apparatus determining whether the driver is in a high-risk driving state based on one or more vehicle parameter; and in response to the driver being in the high-risk driving state, the electronic apparatus reducing the first duration threshold and the second duration threshold.

In some embodiments, the liveness detection method 200 further comprises the electronic apparatus calculating a weight based on one or more vehicle parameter; and the electronic apparatus calculating the first duration threshold and the second duration threshold based on the weight.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A liveness detection apparatus, comprising:

a camera, configured to capture a live image of a driver; and a processor, coupled to the camera, configured to execute the following operations:

calculating an eye open duration of the driver based on the live image within a first time interval;

in response to the eye open duration exceeding a first duration threshold, executing a first confirmation operation to notify the driver to complete a liveness detection operation;

in response to the first confirmation operation has been executed, continuing to calculate the eye open duration based on the live image within a second time interval, wherein the second time interval is later than the first time interval; and in response to the eye open duration exceeding a second duration threshold, executing a second confirmation operation to notify the driver to complete the liveness detection operation, wherein the second duration threshold is greater than the first duration threshold.

2. The liveness detection apparatus of claim 1, wherein the operation of calculating the eye open duration further comprises:

calculating a first eye-opening ratio of the driver in the live image within the first time interval; and determining whether the driver opens their eyes based on the first eye-opening ratio.

3. The liveness detection apparatus of claim 2, wherein the operation of calculating the first eye-opening ratio of the driver in the live image further comprises:

searching for a plurality of eye feature points of the driver in the live image; and calculating the first eye-opening ratio of the driver in the live image based on the eye feature points.

4. The liveness detection apparatus of claim 2, wherein the operation of calculating the first eye-opening ratio of the driver in the live image further comprises:

calculating a first distance between an upper eyelid and a lower eyelid;

calculating a second distance between a left eye corner and a right eye corner; and calculating a ratio of the first distance and the second distance as the first eye-opening ratio.

5. The liveness detection apparatus of claim 1, wherein the operation of calculating the eye open duration further comprises:

calculating a plurality of second eye-opening ratios of the driver in the live image within a third time interval;

calculating a ratio threshold based on the second eye-opening ratios; and calculating the eye open duration within the first time interval and the second time interval based on the ratio threshold.

6. The liveness detection apparatus of claim 1, wherein the first confirmation operation comprises the following operation:

generating a notify signal to control an output apparatus to send a reminder.

7. The liveness detection apparatus of claim 1, wherein the second confirmation operation comprises the following operations:

increasing a triggered count; and in response to the triggered count exceeding a count threshold, adjusting a driving assistance parameter, wherein the driving assistance parameter is configured to determine a level of driving assistance involvement for a vehicle drove by the driver.

8. The liveness detection apparatus of claim 1, wherein the processor is further configured to execute the following operation:

in response to determining the driver closing their eyes, recalculating the eye open duration of the driver in the live image.

9. The liveness detection apparatus of claim 1, wherein the processor is further configured to execute the following operations:

determining whether the driver is in a high-risk driving state based on one or more vehicle parameter; and in response to the driver being in the high-risk driving state, reducing the first duration threshold and the second duration threshold.

10. The liveness detection apparatus of claim 1, wherein the processor is further configured to execute the following operations:

calculating a weight based on one or more vehicle parameter; and calculating the first duration threshold and the second duration threshold based on the weight.

11. A liveness detection method, being adapted for use in an electronic apparatus, wherein the liveness detection method comprises the following steps:

capturing a live image of a driver;

calculating an eye open duration of the driver based on the live image within a first time interval;

in response to the eye open duration exceeding a first duration threshold, executing a first confirmation operation to notify the driver to complete a liveness detection operation;

in response to the first confirmation operation has been executed, continuing to calculate the eye open duration based on the live image within a second time interval, wherein the second time interval is later than the first time interval; and in response to the eye open duration exceeding a second duration threshold, executing a second confirmation operation to notify the driver to complete the liveness detection operation, wherein the second duration threshold is greater than the first duration threshold.

12. The liveness detection method of claim 11, wherein the step of calculating the eye open duration further comprises:

calculating a first eye-opening ratio of the driver in the live image within the first time interval; and determining whether the driver opens their eyes based on the first eye-opening ratio.

13. The liveness detection method of claim 12, wherein the step of calculating the first eye-opening ratio of the driver in the live image further comprises:

searching for a plurality of eye feature points of the driver in the live image; and calculating the first eye-opening ratio of the driver in the live image based on the eye feature points.

14. The liveness detection method of claim 12, wherein the step of calculating the first eye-opening ratio of the driver in the live image further comprises:

calculating a first distance between an upper eyelid and a lower eyelid;

calculating a second distance between a left eye corner and a right eye corner; and calculating a ratio of the first distance and the second distance as the first eye-opening ratio.

15. The liveness detection method of claim 11, wherein the step of calculating the eye open duration further comprises:

calculating a plurality of second eye-opening ratios of the driver in the live image within a third time interval;

calculating a ratio threshold based on the second eye-opening ratios; and calculating the eye open duration within the first time interval and the second time interval based on the ratio threshold.

16. The liveness detection method of claim 11, wherein the first confirmation operation comprises the following step:

generating a notify signal to control an output apparatus to send a reminder.

17. The liveness detection method of claim 11, wherein the second confirmation operation comprises the following steps:

increasing a triggered count; and in response to the triggered count exceeding a count threshold, adjusting a driving assistance parameter, wherein the driving assistance parameter is configured to determine a level of driving assistance involvement for a vehicle drove by the driver.

18. The liveness detection method of claim 11, further comprising:

in response to determining the driver closing their eyes, recalculating the eye open duration of the driver in the live image.

19. The liveness detection method of claim 11, further comprising:

determining whether the driver is in a high-risk driving state based on one or more vehicle parameter; and in response to the driver being in the high-risk driving state, reducing the first duration threshold and the second duration threshold.

20. The liveness detection method of claim 11, further comprising:

calculating a weight based on one or more vehicle parameter; and calculating the first duration threshold and the second duration threshold based on the weight.

* * * * *